United States Patent Office 3,417,076
Patented Dec. 17, 1968

3,417,076
YELLOW AND ORANGE MONOAZO DYES
Mario Francesco Sartori, Wilmington, Del., assignor to E. I. du Pont de Nemours and Company, Wilmington, Del., a corporation of Delaware
No Drawing. Continuation-in-part of application Ser. No. 490,053, Sept. 24, 1965. This application Jan. 31, 1968, Ser. No. 701,851
6 Claims. (Cl. 260—205)

ABSTRACT OF THE DISCLOSURE

Yellow and orange monoazo dyes of the formula

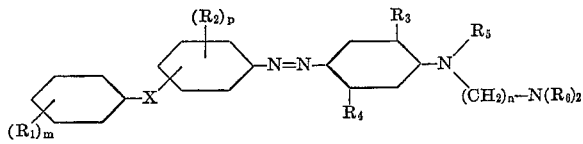

and quanternary salts wherein X is $SO_2$ or CO and $R_1$, $R_2$, $R_3$, $R_4$, $R_5$ and $R_6$ are substituents commonly substituted on dyestuffs thereof are useful for dyeing anionic fibers such as acid-modified nylon and acid-modified acrylic fibers.

CROSS-REFERENCE TO RELATED APPLICATION

This is a continuation-in-part of application Ser. No. 490,053, filed Sept. 24, 1965, and now abandoned.

BACKGROUND OF THE INVENTION

This invention is directed to monoazo dyes in their free base and quaternary salt forms; these dyes are novel and particularly useful for dyeing anionic fibers such as those disclosed in the U.S. Patents 2,837,500; 2,837,501; 3,018,272 and 3,184,436, and particularly for dyeing acid-modified nylon and acrylic carpet fibers.

It is, therefore, an object of this invention to provide, for the dyeing of said fibers, novel yellow and orange monoazo dyes which possess good water solubility, good light-fastness and dyeing properties including favorable dyeing rate, in addition to affording economy of manufacture and good tinctorial value.

Recently, it has been found that dyes known as basic dye bases may be applied effectively to anionic fibers at temperatures of about 100° to 230° C. when the pH is sufficiently basic to maintain the dye in essentially water insoluble form, and the fiber is modified to contain selected cations.

In addition to providing novel cationic dyes, the present invention also provides new basic dye bases, or pendant tertiary amino monoazo dyes, for application to anionic fibers by such a process. The new dyes may be applied in padding or printing operations, and afford colorations which possess good fastness, shade stability and sublimation resistant properties.

The compounds of this invention may be more specifically defined as free bases and quaternary salts of monoazo dyes which, in their free-base form, have the formula:

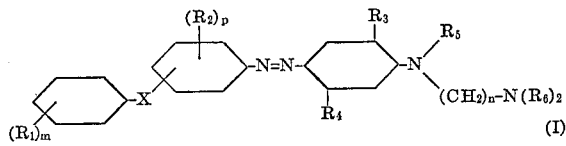

wherein

X is CO or $SO_2$;
$R_1$ is F, Cl, Br, $NO_2$, lower alkyl or lower alkoxy;
$R_2$ is F, Cl, Br, $NO_2$, lower alkyl or lower alkoxy;
$R_3$ is H, Cl, Br, lower alkyl or lower alkoxy;
$R_4$ is H, Cl, Br, lower alkyl, lower alkoxy, —$NHSO_2$—B or —NHCO—B;
B is lower alkyl, phenyl, phenyl-$R_1$;
$R_5$ is H, lower alkyl, —$C_2H_4OH$ or —$C_2H_4CN$;
$R_6$ is lower alkyl, —$C_2H_4OH$, —$C_2H_4CN$ or benzyl; the two $R_6$ radicals may be the same or different;
m and p are 0–3; and n is 2–4.

In this formula, the terms "lower alkyl" and "lower alkoxy" include alkyl radicals of from 1 to 4 C-atoms. Examples of specific dyes coming within this invention and ones that are preferred are:

(a) The azo dye of the formula:

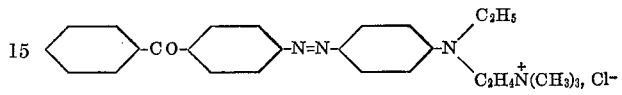

(b) The azo dye of the formula:

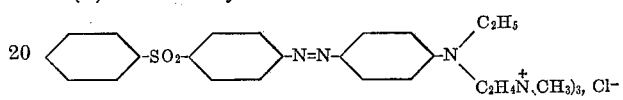

(c) The azo dye of the formula:

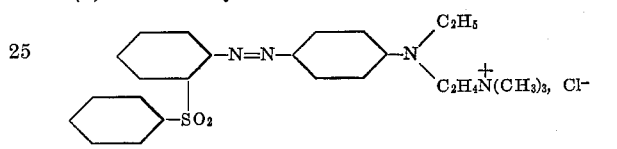

(d) The azo dye of the formula:

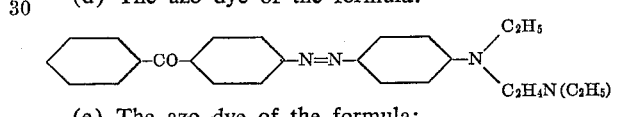

(e) The azo dye of the formula:

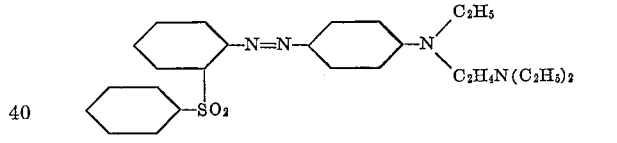

The diazo components which are used in practicing this invention are either known compounds or they may be prepared by known methods. A preferred method consists of condensing a benzoyl chloride or a phenylsulfonyl chloride with a compound of the benzene series by the Friedel-Crafts reaction followed, if necessary, by amination. In an alternate method, the sodium salt of phenylsulfinic acid is condensed with an ortho-halonitrobenzene, followed by reduction of the nitro group to an amino group. Also, diphenylsulfides may be oxidized to the corresponding sulfones, followed by conversion of halo or nitro groups to provide the amino compound.

The coupling components used in this invention are either known compounds or they may be prepared by known methods. For instance, the coupling component used in Example I(a), [2-(N-ethylanilino)ethyl]trimethylammonium chloride, may be prepared by reacting N-ethyl(N-2-hydroxyethyl)aniline with phosphorus oxychloride to produce the corresponding N-2-chloroethyl compound, and then reacting the latter with trimethylamine to produce the quaternary compound. The coupling component employed in Example I(b), [2-(o-chloroanilino)ethyl]diethylmethylammonium methosulfate, may be prepared by alkylating the diamine of formula:

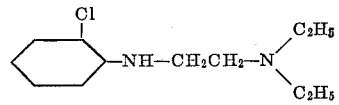

with dimethyl sulfate. The various other cationic coupling components named in this specification may be prepared by one of the above procedures, depending on whether their anionic member is the chloride or the methosulfate ion. Other alkylating agents that may be used are diethyl sulfate, methyl or ethyl p-toluenesulfonate, propyl p-nitrobenzenesulfonate, and the like.

The pendant tertiary amino couplers used in this invention may be prepared from aryl amines by the method described in U.S. Patent No. 3,121,115. The pendant tertiary amino couplers wherein the $R_6$ groups are different (see Formula I) are prepared by reacting an amine of the general formula:

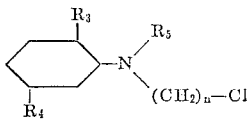

with an unsymmetrical amine such as: ethylmethylamine, benzylethylamine, butylmethylamine, ethylpropylamine, and the like.

The following diazo components which may be utilized illustrate those represented by the general formula:

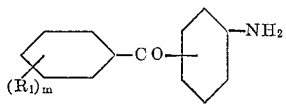     (II)

wherein $R_1$ is defined as above and $m$ is 1–3:

4′-amino-2-chlorobenzophenone,
4′-amino-2,4-dichlorobenzophenone,
2-amino-4′-bromobenzophenone,
3′-amino-3-bromo-4-methylbenzophenone,
2′-amino-2,5-dimethylbenzophenone,
4-amino-4′-ethylbenzophenone,
2-amino-4′-methoxybenzophenone,
2′-amino-4-methoxy-2,5-dimethylbenzophenone,
3′-amino-3,4-dimethoxybenzophenone,
4′-amino-5-chloro-2-methoxybenzophenone,
4-amino-4′-methoxybenzophenone,
3-amino-4′-methoxybenzophenone,
2-amino-2′-nitrobenzophenone,
2-amino-3′-nitrobenzophenone,
4-amino-4′-nitrobenzophenone,
4′-amino-2,4-dinitrobenzophenone,
4′-amino-4-methyl-3-nitrobenzophenone,
4-amino-4′-butylbenzophenone,
4-amino-4′-propoxybenzophenone, and
2-amino-4′-fluorobenzophenone.

Useful diazo components represented by the general formula:

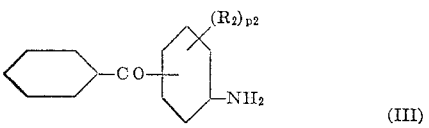    (III)

wherein $R_2$ is defined as above and $p$ is 1–3, are illustrated as follows:

2-amino-5-bromobenzophenone,
4-amino-3-chlorobenzophenone,
2-amino-4,5-dichlorobenzophenone,
4-amino-3,5-dibromobenzophenone,
4-amino-2-methylbenzophenone,
2-amino-5-methylbenzophenone,
2-amino-4,5-dimethylbenzophenone,
3-amino-2,4-dimethylbenzophenone,
2-amino-4,5-dimethoxybenzophenone,
2-amino-4-methoxybenzophenone,
3-amino-5-nitrobenzophenone,
3-amino-4-methyl-5-nitrobenzophenone,
2-amino-6-methyl-3-nitrobenzophenone,
2-amino-3,5-dinitrobenzophenone,
2-amino-4-methyl-3,5-dinitrobenzophenone,
2-amino-5-fluorobenzophenone,
4-amino-2-propylbenzophenone, and
2-amino-4,5-dipropoxybenzophenone.

Useful diazo components represented by the general formula:

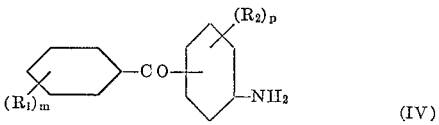     (IV)

wherein $R_1$ and $R_2$ are defined as above, and $m$ and $p$ are 1–2, are illustrated as follows:

2-amino-5-chloro-4′-methoxybenzophenone,
4-amino-2′-chloro-2-methylbenzophenone,
2-amino-4,4′,5-trimethoxybenzophenone,
2-amino-4′,6-dimethyl-3-nitrobenzophenone,
3-amino-4′-chloro-4-methylbenzophenone,
2-amino-4,5-dimethyl-3′-nitrobenzophenone,
2-amino-4,5-dimethyl-4′-nitrobenzophenone,
2′-amino-3-methoxy-2,5′-dimethylbenzophenone,
2-amino-4-chloro-3′,4′-dimethylbenzophenone,
3′-amino-4′-chloro-2,4-dimethylbenzophenone, and
4-amino-4′-butoxy-2-ethylbenzophenone.

Useful diazo components represented by the general formula:

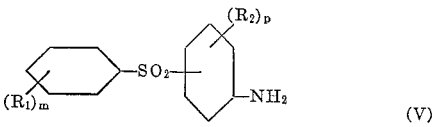     (V)

wherein $R_1$ and $R_2$ are defined as above and $m$ and $p$ are 0–2, are illustrated as follows:

4-chloro-2-(p-chlorophenylsulfonyl)aniline,
p-(p-bromophenylsulfonyl)aniline,
2-chloro-4-(phenylsulfonyl)aniline,
2-chloro-6-(phenylsulfonyl)aniline,
3-chloro-2-(phenylsulfonyl)aniline,
3-chloro-4-(phenylsulfonyl)aniline,
5-chloro-2-(phenylsulfonyl)aniline,
4-chloro-3-(phenylsulfonyl)aniline,
4-chloro-2-(phenylsulfonyl)aniline,
2-bromo-4-(phenylsulfonyl)aniline,
p-(2,4-dichlorophenylsulfonyl)aniline,
p-(2,5-dibromophenylsulfonyl)aniline,
p-(3,4-dichlorophenylsulfonyl)aniline,
5-chloro-2-(p-tolylsulfonyl)aniline,
p-(p-tolylsulfonyl)aniline,
p-(p-propylphenylsulfonyl)aniline,
p-(p-fluorophenylsulfonyl)aniline,
p-(3-chloro-4-methoxyphenylsulfonyl)aniline,
p-(2,4-dimethoxyphenylsulfonyl)aniline,
p-(3,5-dimethoxyphenylsulfonyl)aniline,
p-(p-methoxyphenylsulfonyl)aniline,
p-(p-ethoxyphenylsulfonyl)aniline,
p-(2-methoxy-4-nitrophenylsulfonyl)aniline,
o-(p-methoxyphenylsulfonyl)aniline,
p-(o-methoxyphenylsulfonyl)aniline,
p-(p-nitrophenylsulfonyl)aniline,
2-nitro-3-(phenylsulfonyl)aniline,
2-nitro-5-(phenylsulfonyl)aniline,
2,4-dinitro-5-(phenylsulfonyl)aniline,
2-nitro-4-(p-nitrophenylsulfonyl)aniline,
2-nitro-4-(m-nitrophenylsulfonyl)aniline,
o-(o-nitrophenylsulfonyl)aniline,
2-nitro-4-(phenylsulfonyl)aniline,
2-nitro-4-(p-tolylsulfonyl)aniline,
2,6-dinitro-4-(p-tolylsulfonyl)aniline,
4-(p-butoxyphenylsulfonyl)-3-ethylaniline,
p-(2,5-xylylsulfonyl)aniline,
p-(2,4-xylylsulfonyl)aniline,
p-(2,4-dinitrophenylsulfonyl)aniline,
2,4-dichloro-5-(phenylsulfonyl)aniline,
2,3-diethyl-4-(phenylsulfonyl)aniline and
2,5-dimethoxy-4-(phenylsulfonyl)aniline.

Typical coupling components useful in the practice of the present invention are illustrated by the following which are included in the general formula:

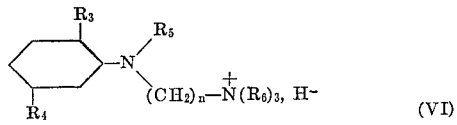

(VI)

wherein $R_3$, $R_4$, $R_5$, $R_6$ and $n$ are defined as above and $A^-$ is a water-solubilizing anion:

[2-(N-methyl-3-ethylanilino)ethyl]trimethylammonium chloride,
[2-(N-butyl-m-anisidino)ethyl]triethylammonium chloride,
Benzyldimethyl[2-(N-2-cyanoethylaniline)ethyl] ammonium chloride,
[2-(N-2-hydroxyethyl-2-chloro-5-methylanilino)ethyl] trimethylammonium chloride,
Benzyldimethyl[2-(N-2-cyanoethylanilino)ethyl] ammonium chloride,
[2-(N-ethyl-2-chloro-5-methoxyanilino)ethyl] 2-hydroxy-ethyldimethylammonium chloride,
Diethylmethyl[2-(o-anisidino)ethyl]ammonium methosulfate,
Diethylmethyl[2-(5-chloro-o-anisidino)ethyl]ammonium methosulfate,
Diethylmethyl[2-(2,5-dimethoxyanilino)ethyl] ammonium methosulfate,
Diethylmethyl[2-(5-methyl-o-anisidino)ethyl]ammonium methosulfate,
[2-(N-ethylanilino)-1-methylethyl]trimethylammonium chloride,
[3-(N-methyl-m-toluidino)-2-methylpropyl] trimethyl ammonium chloride,
[4-(N-ethyl-m-anisidino)butyl]trimethylammonium chloride,
Diethylmethyl[3-(N-ethyl-m-toluidino)propyl] ammonium methosulfate and
[2-(N-ethylanilino)ethyl]trimethylammonium chloride.

It will be understood that any of the diazo components disclosed herein may be coupled with any of the coupling components used in this invention to provide yellow and orange monoazo dyes of the cationic and basic dye base types which are useful in dyeing anionic fibers.

The following is a list of additional coupling components which may be utilized:

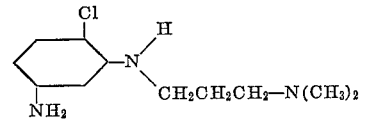

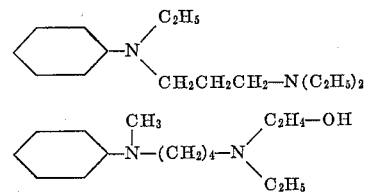

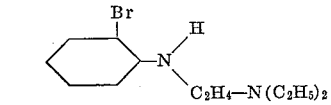

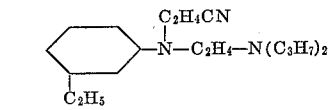

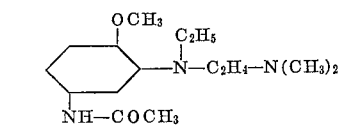

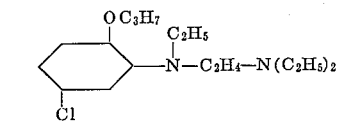

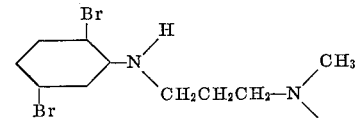

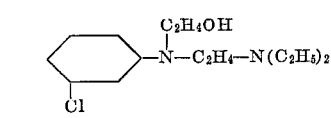

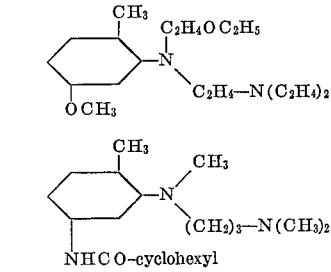

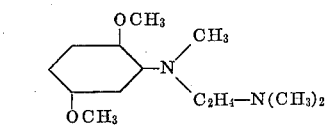

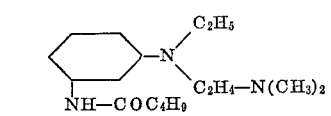

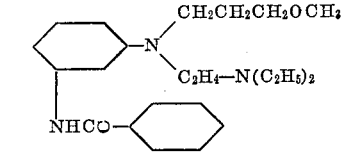

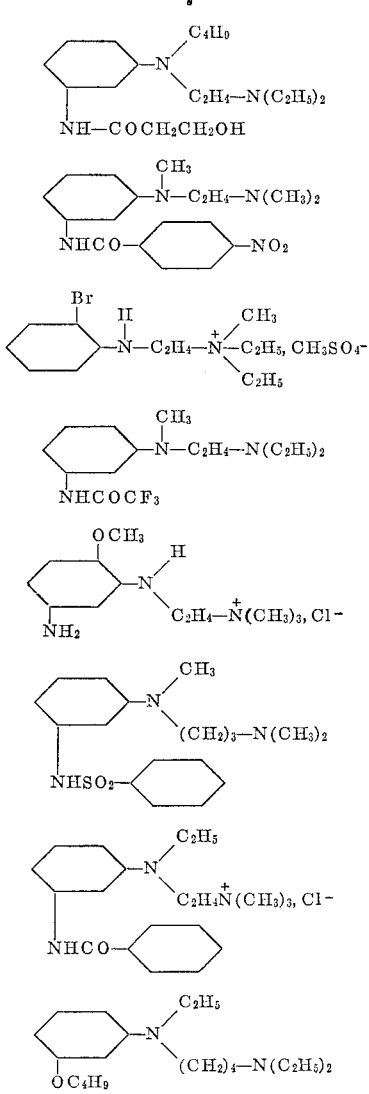

and

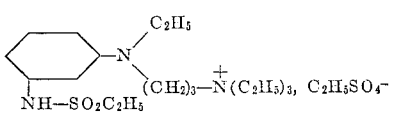

Any of the above disclosed pendant tertiary amine coupling components may be coupled with the herein disclosed diazo components to form monoazo dyes for anionic fibers. In an alternate procedure, these couplers may first be converted to their quaternary ammonium derivatives, as described herein, and then coupled to the diazos to provide cationic dyes.

Representative examples further illustrating the present invention follow.

EXAMPLE I (a) A solution of 2.35 parts of p-(phenylsulfonyl)-aniline in 30 parts of 15% aqueous hydrochloric acid is cooled to 5° C. and the amine is diazotized by the addition of 0.7 part of sodium nitrite. An excess of nitrous acid is maintained in the solution for one hour and is then removed by the addition of small amounts of sulfamic acid. This diazo solution is added slowly to a stirred solution containing 2.45 parts of [2-(N-ethylanilino)ethyl]trimethylammonium chloride in ten parts of water, while keeping the temperature at 5° C. After stirring one hour at this temperature, sodium acetate is added to reduce the acidity to pH 4 and the agitation is continued at 5° to 10° C. for an additional ten hours.

The obtained dye is then salted out, filtered off, washed and dried. The new dye has the formula:

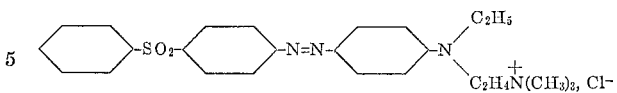

It is an orange powder, which is soluble in water giving a yellow solution. The absorption maximum in methanol is located at 428 millimicrons. It dyes acid-modified acrylic fibers yellow shades of very good fastness properties.

(b) When the [2-(N-ethylanilino)ethyl]trimethylammonium chloride used in part (a) of this example is replaced with a chemical equivalent amount of [2-(o-chloroanilino)-ethyl]diethylmethylammonium methosulfate, a yellow dye of similar properties is obtained.

EXAMPLE II (a) A solution of 2.35 parts of o-(phenylsulfonyl)-aniline in 30 parts of 15% aqueous hydrochloric acid is cooled to 5° C. and the amine is diazotized by the addition of 0.7 part of sodium nitrite. An excess of nitrous acid is maintained in the solution for one hour and is then removed by the addition of small amounts of sulfamic acid. This diazo solution is added slowly to a stirred solution containing 2.45 parts of [2-(N-ethylanilino)ethyl] trimethylammonium chloride in ten parts of water, while keeping the temperature at 5° C. After stirring one hour at this temperature, sodium acetate is added to reduce the acidity to pH 4 and the agitation is continued at 5° to 10° C. for an additional ten hours.

The obtained dye is then salted out, filtered off, washed, and dried. The new dye has the formula:

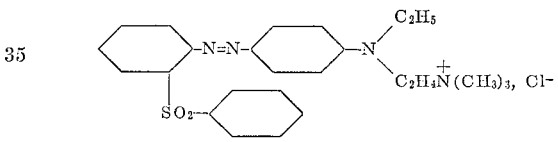

It is an orange powder, which is soluble in water giving a yellow solution. The absorption maximum in methanol is located at 422 millimicrons. It dyes acid-modified acrylic fibers yellow shades of very good fastness properties.

(b) When the [2-(N-ethylanilino)ethyl]trimethylammonium chloride used in part (a) of this example is replaced with a chemical equivalent amount of [2-(o-chloroanilino)ethyl]diethylmethylammonium methosulfate, a yellow dye of similar properties is obtained.

(c) When the coupler of part (a) of the present example is replaced by a chemical equivalent amount of N,N,N'-triethyl - N' - phenylethylenediamine, a yellow monoazo dye is obtained which is useful for dyeing anionic fibers by the method described in Example V.

EXAMPLE III (a) A solution of 1.97 parts of 4-aminobenzophenone in 30 parts of 15% aqueous hydrochloric acid is cooled to 5° C. and the amine is diazotized by the addition of 0.7 part of sodium nitrite. An excess of nitrous acid is maintained for one hour and is then removed by the addition of a small amount of sulfamic acid. This diazo solution is filtered from small amounts of insoluble material and then added slowly to a stirred solution containing 2.45 parts of [2 - (N-ethylanilino)ethyl]trimethylammonium chloride in ten parts of water, while keeping the temperature at 5° C. After stirring one hour at this temperature a 50% solution of sodium acetate is added to reduce the acidity of pH 5 and the agitation is continued at 5° to 10° C. for an additional ten hours. The precipitated dye is then filtered off, washed and dried. The new dye has the formula:

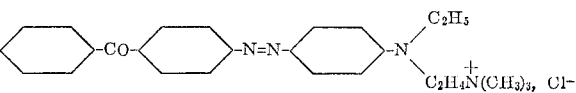

It is an orange powder, which is soluble in water giving a yellow solution. The absorption maximum in methanol is located at 422 millimicrons. It dyes acid-modified acrylic fibers yellow shades of very good dyeing and fastness properties.

(b) When the [2-(N-ethylanilino)ethyl]trimethylammonium chloride used in part (a) of this example is replaced with a chemical equivalent amount of N,N,N'-triethyl-N'-phenylethylenediamine, a dye of similar shade is obtained. This new dye has the formula:

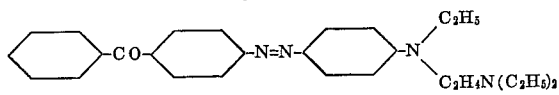

EXAMPLE IV (a) A solution of nitrosylsulfuric acid is prepared by adding 0.78 part of sodium nitrite to ten parts of 96% sulfuric acid. A solution of 2.76 parts of 4-amino-3-bromobenzophenone in a mixture of acetic and propionic acid is then added dropwise at 0° C. and the obtained solution is stirred at 0° C. for three hours. An excess of sodium nitrite is maintained during this time and is then removed by the addition of small amounts of urea. This diazo solution is then added slowly to a stirred solution containing 2.43 parts of [2-(N-ethylanilino)ethyl]trimethylammonium chloride in ten parts of water while keeping the temperature at 0° to 2° C. After stirring for one hour at this temperature, sodium acetate is added to bring the pH to 4, and the agitation is continued at 2° to 5° C. for an additional five hours. A 20% aqueous solution of sodium chloride is then added and the orange dye, which precipitates, is filtered off, washed with 20% sodium chloride solution, and dried. The new dye has the formula:

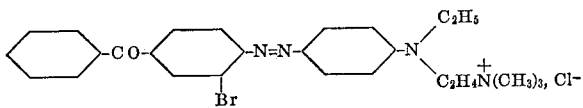

It is an orange powder. The absorption maximum in methanol is located at 440 millimicrons. It dyes acid-modified acrylic fibers orange shade of good fastness.

(b) When the coupler used in part (a) of this example is replaced with a chemical equivalent amount of diethylmethyl[2-(o-anisidino)ethyl]ammonium methosulfate, a dye of similar shade and properties is obtained.

EXAMPLE V (a) One part of a woven fabric composed of acid-modified ($SO_3Na$ form) polyacrylic staple fiber is treated for 30 minutes at 88° C. in a bath containing 40 parts of water and 0.8 part of ammonium sulfate. The fabric thus obtained in its ammonium sulfonate form is rinsed thoroughly in water, and dried.

(b) The dried fabric from part (a) is passed through a padding bath consisting of a dye dispersion prepared by mixing 6 g./l. of the finely divided dye of Example III(b), nonionic dispersant (the condensation product of 20 moles of ethylene oxide with one mole of $C_{18}$ alcohol) to provide a dispersant concentration of 3 g./l., and sodium hydroxide as necessary to provide a pH of 8.5. The wet fabric is squeezed between rolls so as to retain 75% of its dry weight of the padding bath liquor. The fabric is dried and then heated in a circulating hot air oven at 210° C. for 90 seconds. The dyed fabric is rinsed in water, scoured to remove unfixed dye, and finally dried. A bright, clear yellow dyeing having excellent fastness to light, washing and sublimation is obtained.

The cationic dyes of the present invention are applied to anionic fibers, such as acid-modified polyacrylic fibers, from aqueous acidic dyebaths by well known methods.

The embodiments of the invention in which an exclusive property or privilege is claimed are as follows:

1. Free bases and quaternary salts of monoazo dyes which, in free base form, have the formula:

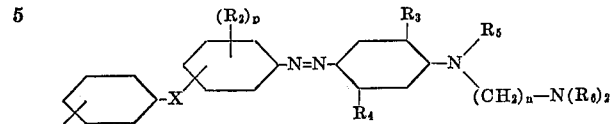

wherein

X is selected from the group consisting of CO and $SO_2$;

$R_1$ is selected from the group consisting of F, Cl, Br, $NO_2$, lower alkyl and lower alkoxy;

$R_2$ is selected from the group consisting of F, Cl, Br, $NO_2$, lower alkyl and lower alkoxy;

$R_3$ is selected from the group consisting of H, Cl, Br, lower alkyl, and lower alkoxy;

$R_4$ is selected from the group consisting of H, Cl, Br, lower alkyl, lower alkoxy, $-NHSO_2-B$ and $-NHCO-B$;

B is selected from the group consisting of lower alkyl, phenyl and phenyl-$R_1$;

$R_5$ is selected from the group consisting of H, lower alkyl, $-C_2H_4OH$ and $-C_2H_4CN$;

$R_6$ is selected from the group consisting of lower alkyl, $-C_2H_4OH$, $-C_2H_4CN$ and benzyl;

the two $R_6$ radicals may be the same or different; $m$ and $p$ are integers of from 0–3 and $n$ is an integer of from 2–4.

2. The azo dye of claim 1 of the formula:

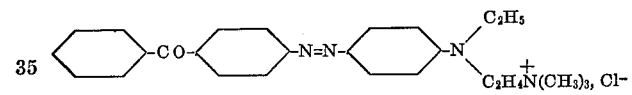

3. The azo dye of claim 1 of the formula:

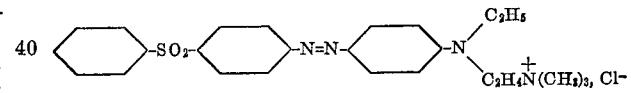

4. The azo dye of claim 1 of the formula:

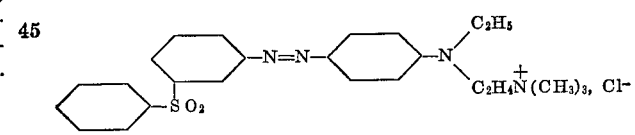

5. The azo dye of claim 1 of the formula:

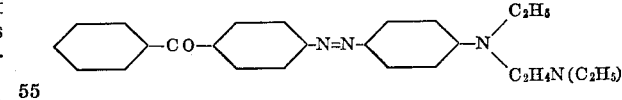

6. The azo dye of claim 1 of the formula:

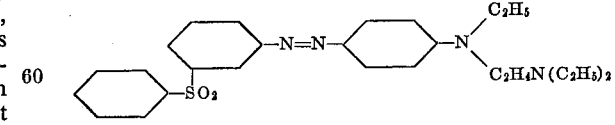

References Cited

UNITED STATES PATENTS 2,225,651   12/1940   McNally et al. _____ 260—205

FLOYD D. HIGEL, *Primary Examiner.*

U.S. Cl. X.R.

260—206, 207, 207.1, 567.6, 570.5, 459, 570, 465, 562, 557, 556, 558, 578; 8—41